United States Patent [19]

Belart

[11] 4,402,554
[45] Sep. 6, 1983

[54] PRESSURE CONTROL DEVICE FOR A PRESSURE ACCUMULATOR

[75] Inventor: Juan Belart, Walldorf, Fed. Rep. of Germany

[73] Assignee: ITT Industries, Inc., New York, N.Y.

[21] Appl. No.: 424,792

[22] Filed: Sep. 27, 1982

Related U.S. Application Data

[63] Continuation-in-part of Ser. No. 221,585, Dec. 31, 1980, abandoned.

[51] Int. Cl.³ .............................. B60T 8/02; F15B 1/02
[52] U.S. Cl. ............................................ 303/10; 303/3; 303/116; 303/119
[58] Field of Search .................... 303/116, 2, 3, 10, 11, 303/12, 15, 114, 113, 119, 52, 6 R, 6 A, 68-69, 61-63; 60/582; 417/18, 44, 38; 60/445, 486, 430; 188/151 A, 181 A, 181 R, 345

[56] References Cited

U.S. PATENT DOCUMENTS

| | | | |
|---|---|---|---|
| 2,629,537 | 2/1953 | Graybrook et al. | 417/18 |
| 2,945,352 | 7/1960 | Stelzer | 60/582 X |
| 2,976,807 | 3/1961 | Hill | 417/18 X |
| 3,279,377 | 10/1966 | Jacobson | 417/44 X |
| 3,756,666 | 9/1973 | Leiber | 303/10 |
| 3,836,206 | 9/1974 | Leiber | 303/10 |
| 4,033,637 | 7/1977 | Leiber | 303/10 X |
| 4,305,624 | 12/1981 | Belart et al. | 303/116 X |

OTHER PUBLICATIONS

*Vickers Handbook of Hydraulics,* 1966, pp. 96-97.
"Outlines of Practical Control Technology", published by R. Oldenbourg, 1967, pp. 135-139, from the book by Dr. Ing. Erwin Samal.

*Primary Examiner*—Douglas C. Butler
*Attorney, Agent, or Firm*—John T. O'Halloran; Alfred C. Hill

[57] ABSTRACT

Pressure control systems for a pressure accumulator are known in which the pressure accumulator is fed by a controllable pump. When the pressure accumulator serves to supply at least two user components each requiring a different minimum feed pressure for correct operation, it is desired to provide a pressure control system which is safe in its mode of operation, simple in its construction and needs little energy for maintaining the feed pressure. This is accomplished according to the present invention by a switching device which switches on the pump when the accumulator pressure falls below a first threshold value corresponding to lowest minimum feed pressure of the two user components and which switches off the pump when the accumulator pressure reaches a second threshold value corresponding to the highest minimum feed pressure of the two user components with the switching device responding to the return pressure from that one of the two user components having the highest minimum feed pressure when operated to raise the first threshold value to approximately the second threshold value.

14 Claims, 1 Drawing Figure

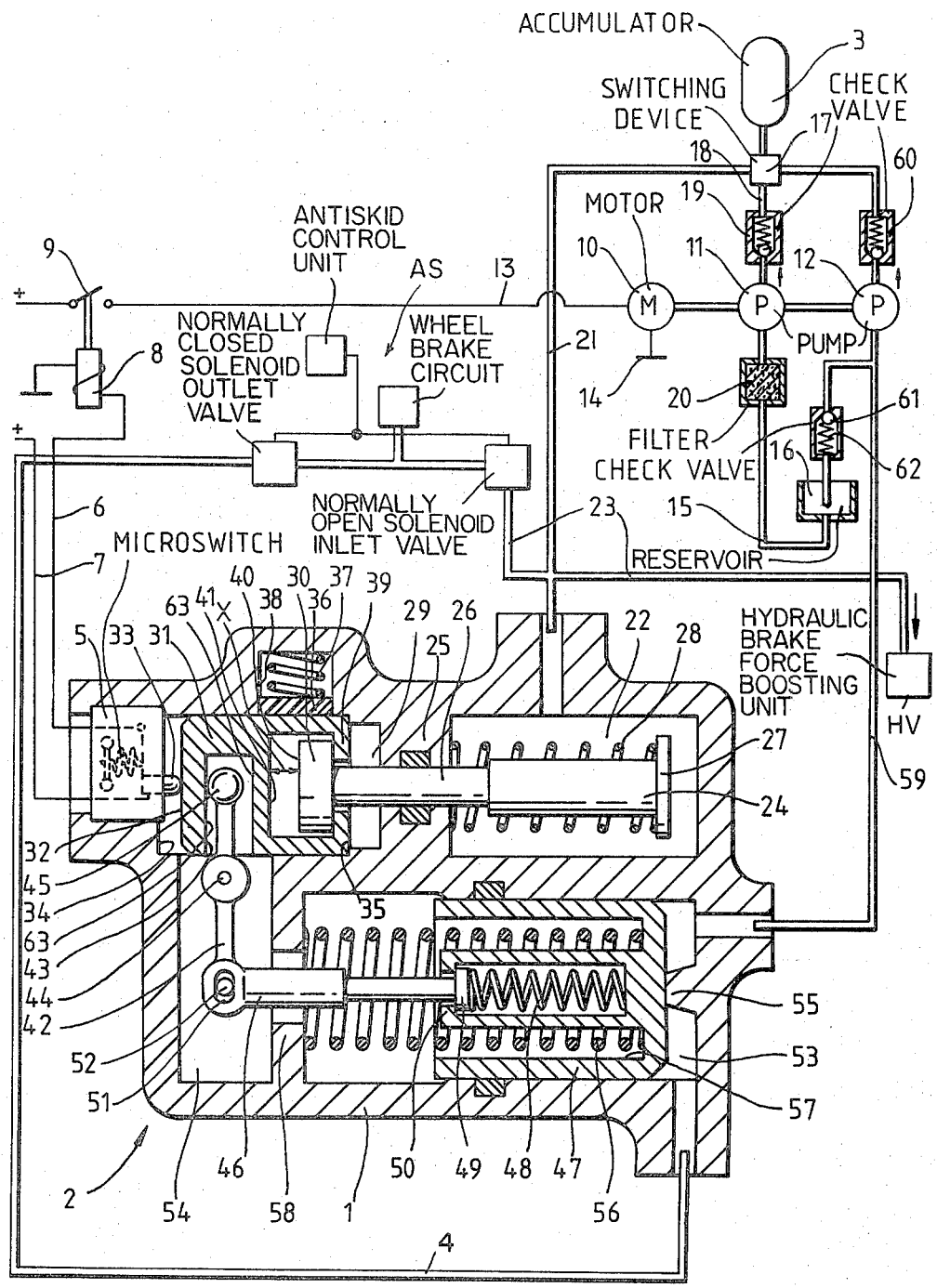

PRESSURE CONTROL DEVICE FOR A PRESSURE ACCUMULATOR

CROSS-REFERENCE TO RELATED APPLICATION

This is a continuation-in-part application of application Ser. No. 221,585, filed Dec. 31, 1980, now abandoned.

BACKGROUND OF THE INVENTION

The present invention relates to a pressure control device for a pressure accumulator, in particular, for automotive vehicles with a brake slip control system. The pressure accumulator is fed by a disconnectible pump and at least two user components are adapted to be connected to the pressure accumulator, the user components requiring different minimum feed pressures for correct operation.

The problems with such a feeding of different pressure fluid user components are that the admissible lowest accumulator pressure has to be determined according to the highest minimum feed pressure of all connectible user components. Consequently, the pump feed will be constructed such that the pressure in the pressure accumulator is not allowed to drop under the level of the highest minimum pressure required. As a result, the pump feed has to be switched on relatively often, although the user component with the highest minimum feed pressure is put into operation only rarely.

Pressure control systems of the aforementioned type are described in the book by Dr.-Ing. Erwin Samal "Outlines of Practical Control Technology", published by R. Oldenbourg, 1967. On page 135, a pressure control valve is shown switching on and off the pump feed dependent on the pressure prevailing in a pressure accumulator. As another example, a water level regulator is shown on page 137 controlling the height of a water level by using an electric switching arrangement such that the pump feed is switched on upon attainment of a presettable minimum amount and the water level increases up to a presettable maximum amount, upon attainment of which the pump feed is switched off.

Likewise, pressure switches are shown in the handbook "Vickers Handbook of Hydraulics", 1966, in which a hydraulic fluid acts on a piston movable against the force of a spring and actuating a microswitch after having travelled a predetermined distance. However, pressure switches of this kind are only able to be used for switching on or off a unit so that such a switch would have to be available in duplicate, if a greater hysteresis were desired. Hydraulic switches with adjustable minimum switching pressure and adjustable maximum switching pressure have been described on pages 96 and 97.

The prior art switching elements mentioned hereinabove are not in all cases in a position to satisfactorily solve the problem of pressure control. Particularly in the event of several, different user components being connected to one single pressure accumulator, it is desirable to control the pressure in the pressure accumulator such that in each case only the minimum feed pressures of the connector user components are guaranteed. Especially with regard to brake slip control systems, pressure fluid being pressurized as constantly as possible is required for governing the pressure modulation. At the same time, however, the pressure accumulator feeds a hydraulic auxiliary force for actuation of the brake unit and maybe still other hydraulic user components. As to the hydraulic brake booster, the controlled delivery of pressure is not subjected to such strict conditions of maintaining constrant values as is required in the case of pressure fluid serving for control of the pressure modulation for the brake slip control system.

SUMMARY OF THE INVENTION

It is, therefore, an object of the present invention to provide a device for pressure control of the type referred to hereinabove, rendering possible the distribution of the required pressure fluid for several user components with different minimum feed pressures by means of a common pressure accumulator and decreasing the energy necessary for distribution of the accumulator pressure. In addition to this, the device is safe in its mode of operation and simple in its construction.

A feature of the present invention is the provision of a pressure control device for a pressure accumulator for automotive vehicles having an antiskid control system comprising: at least one user component in addition to the antiskid control system capable of being coupled to the accumulator, the one user component and the antiskid control system requiring different minimum feed pressures for correct operation; a controllable pump arrangement to feed pressure fluid to the accumulator; and a switching device coupled to the accumulator to switch on a pump drive means connected to the pump arrangement when pressure in the accumulator falls below a bottom switching threshold corresponding to a first minimum feed pressure for the one user component, to switch off the pump drive when pressure in the accumulator attains a top switching threshold corresponding to a second minimum feed pressure for the antiskid control system, the second minimum pressure being greater than the first minimum pressure and to increase the bottom switching threshold to approximately the top switching threshold when the antiskid control system is operated.

This device in accordance with the present invention may be constructed such, for example, that a pressure sensor monitors the accumulator pressure and transmits an electric signal to an electronic control device governing the pump drive as a function of electronically established switching thresholds, with at least the bottom switching threshold being modified dependent upon the switched-on user components.

According to a preferred embodiment of the device, the switching device includes a first pressure sensor, acted upon by the accumulator pressure, a second pressure sensor, acted upon by the pressure of a return line of a user component, and an electric switch controlled by the first and second pressure sensors. This way, two different pressures are monitored by one switching device, and the switch may be actuated corresponding to the pressure conditions.

The first pressure sensor includes a first piston acting on the electric switch against the force of a spring via a second piston and the second pressure sensor includes a third or pressure piston connected to the second piston via a lever arrangement. The lever arrangement incudes a swivelling lever having one end portion engaging a radial opening of the second piston and the other end portion connected to an actuating member which is connected to the third piston.

It is suitable for determination of the hysteresis of the switching device, i.e. the maximum distance between the switching thresholds, that the first piston and the second piston are interconnected by a lost motion clutch, and that a friction member exists which acts on the second piston. A particularly simple arrangement of the friction member is achieved in that the friction member is located in an opening of the switching device's housing and is pressed radially against the circumferential surface of the second piston by means of a spring.

To the end that the pump drive is not switched on in the event of sufficient pressure prevailing in the pressure accumulator and the third piston of the second pressure sensor is simultaneously pressurized and that the chamber bounded by the third piston takes care of an accumulating function from time to time, the actuating member is connected to the third piston such that the third piston acts on the actuating member via a spring when moving in the sense of the switching-on of the switch and acts on the actuating member directly when moving reversely. To this end, the force of the spring is greater than the friction contact between the friction member and the second piston.

To avoid jamming of the lever arrangement the one end portion of the swivelling lever has a ball on the end thereof located in the radial opening of the second piston with clearance and the actuating member includes a pivot engaging an oval opening in the other end portion of the swivelling lever.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a pressure control device in accordance with the principles of the present invention.

DESCRIPTION OF THE PREFERRED EMBODIMENT

Referring to the FIGURE, the pressure control device includes a housing 1 of a hydraulic-electrical switching device 2 which actuates in response to the pressure in the pressure accumulator 3 and the prevailing pressure of return line 4 a microswitch 5, which electrically operates a relay 8 via the electric control lines 6 and 7.

When relay 8 is activated and closes contact 9, voltage will be applied via the line 13 to the electric motor 10, motor 10 having a ground connection 14. Electric motor 10 when put into operation will drive the pumps 11 and 12 through a common drive, with pump 11 delivering pressure fluid from the suction connection 15 of the pressure fluid reservoir 16 via a hydraulic switching member 17 to pressure accumulator 3. Provided in the pressure line 18 is a check valve 19 opening against the pressure of pressure accumulator 3 and, thus, preventing depletion of pressure accumulator 3 in the event of leakage of pump 11.

To filter out any dirt particles possibly existing in pressure fluid, a filter 20 is provided in suction connection 15.

The pressurized fluid of pressure accumulator 3 is led via a pressure line 21 to a pressure chamber 22 of hydraulic-electrical device 2. As a branch of pressure line 21, another pressure line 23 leads to the user components HV and AS. User component HV, for example, may be a hydraulic brake force boosting circuit, such as a pressure differential brake booster. User component AS, for example, may be a known antiskid control system such as disclosed in U.S. Pat. No. 4,305,624 including a normally open solenoid controlled inlet valve coupled to at least one wheel brake circuit to supply brake fluid thereto from the master cylinder upon brake pedal actuation, a normally closed solenoid controlled outlet valve coupled between the one brake circuit and a return line, such as return line 4, and a control unit to close the inlet valve to block brake fluid flow into the wheel brake circuit and to open the outlet valve to release pressurized brake fluid from the wheel brake circuit when an impending skid condition is detected, resulting effectively in a modulation of the braking action at the brake of the wheel brake circuit.

A first piston 24 is located in pressure chamber 22 sealingly penetrating an end wall 25 of pressure chamber 22 with its portion 26, the diameter of which is dimensioned smaller than the portion in chamber 22. Located between end wall 25 and the portion 27 of first piston 24, whose diameter is dimensioned the largest, is a spring 28, the force of which has to be overcome by first piston 24 when moving in the direction of end wall 25.

The smaller portion 26 of first piston 24 enters into a chamber 29 and ends in chamber 29 in a head 30 constructed with a greater diameter than portions 26 and 27 of first piston 24. Arranged in chamber 29 is a second piston 31 whose end surface 32 abuts without clearance a contact pin 33 of a microswitch 5 fixedly secured in housing 1.

On the side remote from end surface 32, second piston 32 embraces head 30 so that first piston 24 and second piston 31 abut each other in the illustrated rest position. Head 30, and, consequently, first piston 24, is movable relative to second piston 31 by an axial clearance x. This connection of first piston 24 with second piston 31 is a lost motion clutch and effects a certain hysteresis of the monitoring switching device, as will be described hereinbelow. Second piston 31 is axially movable within limits between the stops 34 and 35 and is loaded by a friction member 36 acting radially thereon. Friction member 36 is urged radially into abutment with piston 31 with a predetermined force by means of a spring 37 which is disposed in a bore 38 located radially with respect to second piston 31.

The mode of operation of the parts of the hydraulic-electrical switching device 2 described to this point is as follows.

In the rest position illustrated, second piston 31 bears against stop 35, and microswitch 5 is closed. Relay 8 is activated and contact 9 is thus closed, thereby delivering voltage to motor 10. Pump 11 delivers pressure fluid from pressure fluid reservoir 16 to pressure accumulator 3. The pressure prevailing in pressure accumulator 3 is transmitted to chamber 22 via pressure line 21. The pressure in chamber 22 acts on first piston 24 and displaces first piston 24 against the force of spring 28 in the direction of microswitch 5. After the axial clearance x is overcome, second piston 31 will be entrained by first piston 24 and moved towards microswitch 5. Contact pin 33 opens the previously closed contact of microswitch 5. Relay 8 is de-activated due to the break of the relay coil circuit causing contact 9 to be opened and the pump feed is interrupted. Second piston 31 will move into abutment with stop 34 when the maximum pressure is built up, the device is now in a left-hand end piston in which pressure accumulator 3 is charged to 90 bars, for instance.

With the pressure slowly dropping below 90 bars, spring 28 will displace first piston 24 to the right so that its end surface 40 will lift from the end surface 41 of second piston 31. Second piston 31, itself will, however, not move since second piston 31 is maintained in its position by friction member 36. Friction member 36 is constructed so as to keep the spring-loaded contact pin 33 in its open position.

With the pressure continuing to drop, spring 28 will displace first piston 24 still further to the right and head 30 approaches stop 39 of second piston 31. When the back rim of head 30 is in abutment with stop 39, spring 28 will displace the entire arrangement comprising first piston 24 and second piston 31 to the right. In the event of a further pressure decrease, contact pin 33 of microswitch 5 will follow this movement and the pump feed will be switched on again. This might, for instance, happen at an accumulator pressure of approximately 70 bars.

Accumulator 3 will now be charged up again to 90 bars, and head 30 will have to cover axial clearance x from its end surface 40 to end surface 41 of second piston 31. Only after clearance x has been covered—the pressure will have been increasing to approximately 90 bars during this time—will second piston 31 be able to be displaced again for another switching process.

It is, consequently, the purpose of the lost motion between second piston 31 and head 30 of first piston 24 to determine the width of the hysteresis, of approximately 20 bars in the example employed, in cooperation with spring 28 and friction member 36. As will be appreciated, once the device is constructed, the hysteresis may be selected by an appropriate choice of the spring characteristic of spring 28.

Connected in parallel to this portion of switching device 2 is another portion which engages via a lever 42 in a radial groove 43 of second piston 31. Lever 42 is pivoted on an axle 44 rigidly located in housing 1. The end portion 45 of lever 42 is constructed like a ball end and is arranged in second piston 31 such that the center of ball end 45 is situated in the vicinity of the axis of second piston 31 when ball end 45 is moving. The other end portion of lever 42 is in communication with an actuating member 46, which bears via a spring 48 against a third or pressure piston 47. In this arrangement, actuating member 46 is inserted in pressure piston 47 in such a manner that spring 48 keeps the head-like constructed end portion 49 in pressure piston 47 in abutment with the stop 50 of pressure piston 47. The end portion of lever 42 acting on actuating member 46 includes an oval opening 51, in which a pivot 52 attached to the end portion of actuating member 46 engages.

Provision of oval opening 51 ensures that lever 42 and axle 44 remain swivelling upon an admissible axial movement of actuating member 46 without the risk of the device being jammed.

Pressure piston 47 is sealingly slidable in housing 1, thereby separating a pressure chamber 53 from the remaining unpressurized space 54. To have a defined pressure chamber 53 available even in the illustrated inactivated position, a stop 55 is provided in housing 1 against which pressure piston 47 abuts when in its rest position. Pressure piston 47 is held in its rest position by a spring 56, spring 56 being disposed in a circular groove 57 in pressure piston 47 and bearing against a stop 58 in housing 1.

Chamber 53 is connected to return line 4, which in turn is connected to the outlet valve of user component AS. Via the suction connection 59, pump 12—with motor 10 running—delivers the pressure fluid from pressure chamber 53 to pressure accumulator 3 through a check valve 60 opening against the pressure of pressure accumulator 3. Suction connection 59 communicates with pressure fluid reservoir 16 via a check valve 61. In this arrangement, spring 62 of check valve 61 is constructed such that a pressure of, for instance, 2 bars at the most is allowed to develop in pressure chamber 53. If fluid is fed via line 4 which is pressurized to a higher extent, check valve 61 will open and transmit the surplus pressure fluid to pressure fluid reservoir 16.

When the outlet valve of the user components AS is opened during a detected impending skid, brake pressure fluid under pressure is released from the brake circuit into line 4 thereby developing pressure of approximately 1 to 2 bars in pressure chamber 53. Assuming that a pressure of about 80 bars prevails in pressure accumulator 3 at the time the user component was switched on, head 30 will, on the one hand, be spaced a specific amount from end surface 41 of second piston 31, but will, on the other hand, also have a specific clearance from stop 39.

Caused by the pressure in pressure chamber 53, pressure piston 47 will be displaced to the left, actuating rod 46 will move lever 42, and the forward movement of pressure piston 47 will be transformed into a backward movement of second piston 31 due to the point of rotation 44 of lever 42. Since, however, ball end 45 of lever 45 has a slight axial clearance in radial groove 43, ball end 45 will be moved into abutment with the side 63 of groove 43 only after a slight forward movement of pressure piston 47 and will displace second piston 31 to the right side with pressure piston 47 continuing to move. This results in an intervention in the switching range of the upper portion of switching device 2 and an immediate switching on of motor 10 and, hence, pumps 11 and 12 by closing microswitch 5.

When this occurs, not only will pump 11 deliver pressure fluid from pressure fluid reservoir 16 to accumulator 3, but pump 12 will also supply the pressure fluid prevailing in pressure chamber 53 to pressure accumulator 3.

The pressure in pressure accumulator 3 will now rise up to 90 bars, and at that moment, end surface 40 of head 30 will abut end surface 41 of second piston 31 again and will displace second piston 31 to the left against the force of lever 42, thus switch off microswitch 5 again and interrupting the pump feed. If pressure fluid is continued to be fed to pressure chamber 53 via return line 4, pressure piston 47 will continue to be displaced to the left; however, in doing so, pressure piston 47 will not be able to transmit its forward movement to lever 42. Nevertheless, in order to be in a position to execute a forward movement, spring 48 is compressed due to the force acting on pressure piston 47. According to this, switching device 2 does not only have the function of pressure control, but pressure chamber 53 serves at the same time as a volume accumulator for pump 12.

If the pressure in pressure accumulator 3 drops in this position of switching device 2 on account of the higher pressure fluid demand by the connected user components, first piston 24 will move away from microswitch 5 to the right due to the force of spring 28. However, in this working position second piston 31 will not remain in its position in which it was shifted by first piston 24, since the force of spring 48 acts on second piston 31 via actuating member 46 and lever 42 and keeps second piston 24 in abutment with head 30. Consequently, microswitch 5 will move to the right upon a slight movement of first piston 24 and will switch on again at once. The pressure will be immediately re-increased to 90 bars.

Thus, the entire switching device 2 has the following effect.

Fluctuations of pressure up to 20 bars, for example, are permitted in pressure accumulator 3 under normal operating conditions, controlled by first piston 24 and second piston 31 fastened to first piston 24 in the sense of a lost motion clutch. This is absolutely sufficient for feeding the connected user component HV. Motor M is put into operation only rarely due to such a hysteresis width which admittedly is comparatively large. If, however, the other user component AS is switched on requiring a higher and considerably more constant pressure level, the arrangement composed of pressure piston 47, actuating member 46 and lever 42 will influence the remainder of switching device 2 in such a manner that the hysteresis width will be reduced to a few bars (1 to 2 bars).

Switching devices of this type are particularly advantageous for use in vehicles with antiskid control systems, the user component AS. A hydraulic brake force boosting unit, allowing comparatively great fluctuation of pressure, may be provided as a first user component HV connected to pressure accumulator 3. If, however, an antiskid control operation is provided with the help of the pressure fluid in pressure accumulator 3, the accumulator pressure is required to be relatively constant for ensuring a perfect control operation. This object may be achieved in an easy way by the described embodiment of the switching device in accordance with the present invention. The increase of the switching-off threshold may be determined by the proportioning of spring 48. It is, of course, also possible to realize the hydraulic modes of operation described herein by an electromechanic switching device or likewise by an electronic switching device. But these switching devices would require the translation of the hydraulic pressure signals into electric signals, which has a certain expenditure as a result. The described switching device may be used without any difficulties and without entailing a particularly great expenditure of power and electrical outfit in any pressure system, in which various user components are connected to one pressure accumulator and in which these various user components expect different minimum feed pressures from the accumulator.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pressure control device for a pressure accumulator for automotive vehicles having an antiskid control system comprising:
   at least one user component in addition to said antiskid control system capable of being coupled to said accumulator, said one user component and said antiskid control system requiring different minimum feed pressures for correct operation;
   a controllable pump arrangement to feed pressure fluid to said accumulator; and
   a switching device coupled to said accumulator to switch on a pump drive means connected to said pump arrangement when pressure in said accumulator falls below a bottom switching threshold corresponding to a first minimum feed pressure for said one user component, to switch off said pump drive when pressure in said accumulator attains a top switching threshold corresponding to a second minimum feed pressure for said antiskid control system, said second minimum pressure being greater than said first minimum pressure, and to increase said bottom switching threshold to approximately said top switching threshold when said antiskid control system is operated.

2. A device according to claim 1, wherein
said switching device is a pressure sensor monitoring the pressure of said accumulator and transmitting an electric signal to an electronic control device controlling the operation of said drive means dependent upon said top and bottom switching thresholds, said bottom switching threshold being modified dependent upon which of said one user component and said antiskid control system is placed into operation.

3. A device according to claim 2, wherein
said switching device includes
   a first pressure sensor acted upon by pressure of said accumulator,
   a second pressure sensor acted upon by pressure in a return line from said antiskid device, and
   a switch coupled to said drive means controlled by said first and second pressure sensors.

4. A device according to claim 3, wherein
said first pressure sensor includes
   a first piston exposed to pressure of said accumulator acting on said switch through a second piston, and
said second pressure sensor includes
   a third piston exposed to pressure in said return line connected to said second piston via a lever arrangement.

5. A device according to claim 4, wherein
said first piston and said second piston are interconnected by a lost motion arrangement, and
said second piston is acted upon by a friction member.

6. A device according to claim 5, wherein
said friction member is located in an opening of a housing for said switching device and is urged radially against the circumferential outer surface of said second piston by a first spring.

7. A device according to claims 4, 5 or 6, wherein
said lever arrangement includes
   a swivelling lever having one end portion engaging a radial opening in said second piston, and
   an actuating member having one end thereof connected to said third piston and the other end thereof coupled to the other end portion of said swivelling lever.

8. A device according to claim 7, wherein
said actuating member is connected to said third piston such that said third piston acts on said actuating member via a second spring when moving in a sense of switching on said switch and acts on said actuating member directly when moving in an opposite sense.

9. A device according to claim 8, wherein the force of said second spring is greater than the friction contact between said friction member and said second piston.

10. A device according to claim 8, wherein said third piston is acted upon by a third spring in the same direction as said second spring.

11. A device according to claim 7, wherein said one end portion of said swivelling lever has on the end thereof a ball which is located in said radial opening with axial clearance.

12. A device according to claim 11, wherein said other end of said actuating member has a pivot thereon engaging an oval opening in said other end portion of said swivelling lever.

13. A device according to claim 7, wherein said other end of said actuating member has a pivot thereon engaging an oval opening in said other end portion of said swivelling lever.

14. A device according to claim 8, wherein said top switching threshold is controlled when said antiskid control system is operated by selection of the spring characteristics of said second spring.

* * * * *